May 19, 1959 B. F. HERR 2,886,847
FEEDING DEVICE FOR CALENDERS
Filed Nov. 9, 1955 2 Sheets-Sheet 1

INVENTOR
BENJAMIN F. HERR

ATTORNEY

May 19, 1959
B. F. HERR
2,886,847
FEEDING DEVICE FOR CALENDERS
Filed Nov. 9, 1955
2 Sheets-Sheet 2
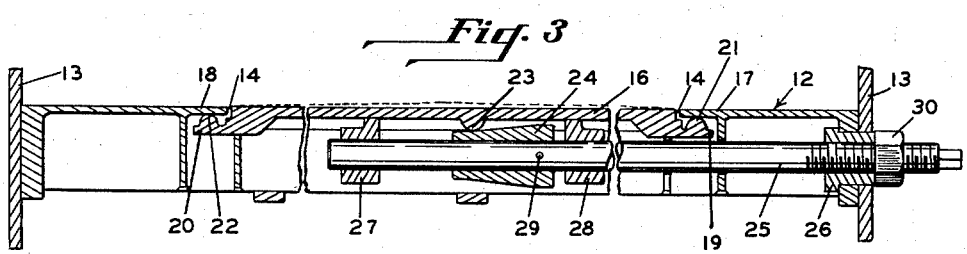
INVENTOR
BENJAMIN F. HERR
ATTORNEY

United States Patent Office 2,886,847
Patented May 19, 1959

2,886,847

FEEDING DEVICE FOR CALENDERS

Benjamin F. Herr, Manheim Township, Lancaster County, Pa., assignor to Armstrong Cork Company, Lancaster, Pa., a corporation of Pennsylvania Application November 9, 1955, Serial No. 545,984

8 Claims. (Cl. 18—4)

This invention relates to an apparatus for feeding particulate materials. The invention is particularly useful in the manufacture of surface coverings such as linoleum and other floor, wall, and counter top coverings.

Surface coverings are made by calendering a mass of particles of color composition such as linoleum composition. The composition may be granulated and delivered directly to the nip between a pair of calender rolls. With some patterns in which a grained appearance is provided on the wearing surface and extending into the body, a number of differently colored masses are mottled together, and the resultant mix is delivered to the calender and consolidated. In another type of graining, chips of plastic composition, about ½" x ½" x .100" for instance, of different colors and some with a jaspe graining are fed to the calender and consolidated into a grained sheet. In both of these processes, care must be exercised in the feeding of the particles to the nip between the calendar rolls to avoid undesirable variations in graining which result when the amount of material delivered into the nip varies substantially.

Hand feeding of the calender has been resorted to; and where chips are being fed, a crew of four feeders may be required across the width of an 80" calender, and even then there may be some objectionable graining produced due to the human element involved and an inability to visually "gauge" the spring or crown of the calender rolls during operation.

An object of the present invention is to provide an apparatus for feeding particulate materials as a continuous stream with provision for varying the depth of the stream across its width.

Another object of the invention is to provide an apparatus for feeding a calender at a uniform rate with a nonuniformly distributed volume of mix.

A further object of the invention is to provide an apparatus for continuously delivering mix at a uniform rate to a calender in synchronism with the rate of consumption of mix by the calender.

Other objects of the invention will be clear from consideration of the following description of certain embodiments of the invention which will be described in conjunction with the attached drawings in which:

Figure 3 is a longitudinal sectional view of the apparatus of Figure 2.

According to the invention, there is provided a delivery member such as a belt for conveying particles from a source of supply to a metering station. At this station there is provided a distribution member such as a fluted roll which cooperates with the delivery belt or roll to restrict the amount of material passing through the metering zone. Where the unit is associated with a sheeting calender, means are provided for arching the delivery belt to provide a passageway between the delivery member and the distribution member which is smaller at its central zone than at the zones which feed the ends of the calender rolls. Thus, provision is made to continuously feed a nonuniformly distributed volume of material to the calender.

Figure 1:
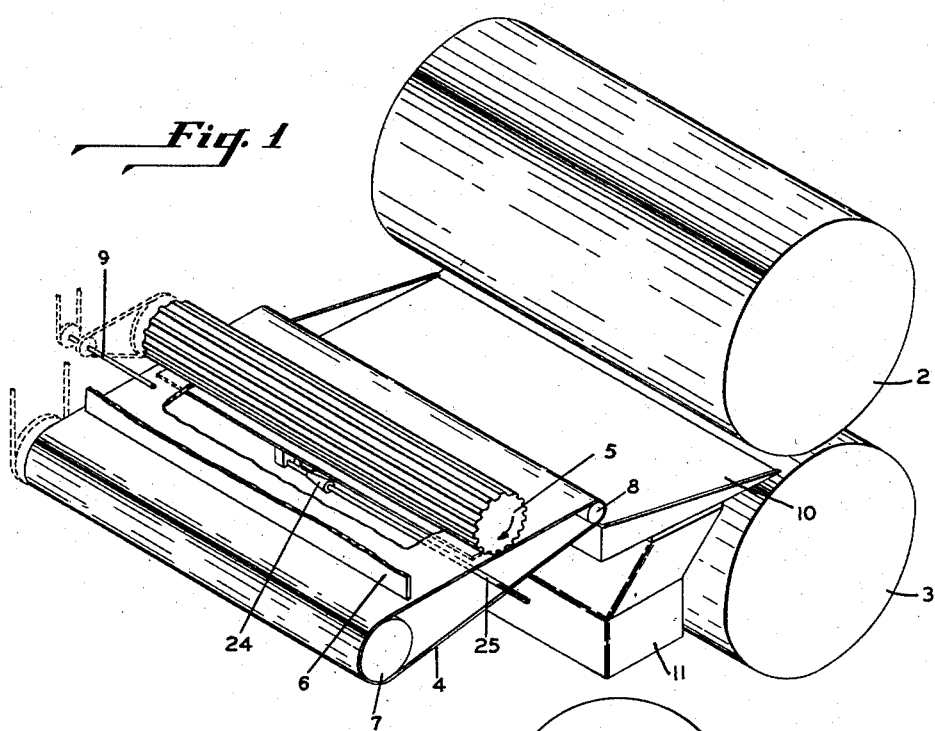
Figure 1 is a diagrammatic perspective view of a feeder embodying the invention.

Referring first to Figure 1, the general arrangement there shown includes a pair of calender rolls 2 and 3 which are arranged to be fed continuously with a measured quantity of plastic composition, such as linoleum composition, rubber composition, vinyl chloride-vinyl acetate resin-bound composition, and the like. Metering of the composition fed to the calender is effected by a moving conveyor belt 4 above which is mounted a fluted distribution roll 5. A plate 6 shown in the drawing represents the rear wall of a hopper into which the plastic composition is delivered. The conveyor 4 is trained over rolls 7 and 8, the roll 7 being driven, preferably in synchronism with the calender rolls 2 and 3, from the same power source, through a variable speed transmission. The distribution roll 5 is power driven in the direction of the arrow through a variable speed transmission and is arranged for adjustment with respect to the conveyor, pivoting about the axis 9, as indicated in Figure 1.

Interposed between the conveyor 4 and the calender rolls 2 and 3 is an inclined vibrating feeder 10, the vibrating mechanism of which has been indicated diagrammatically at 11.

With this type of feeder, it is possible to deliver the plastic composition to the nip of calender rolls 2 and 3 at an essentially uniform rate for calendering. The particles of plastic composition may be in the form of small pieces, say ½" x ½" x .100"; they may be granulated like rock salt; they may be fine like sand; or they may be a combination of fine particles and irregularly shaped small thin chips such as are used in the making of surface coverings in simulation of terrazzo floors. Pieces of other sizes and shapes may be delivered by the apparatus. The nature of the particles is not of importance so far as the present invention is concerned. The equipment illustrated in the drawings is intended for operation upon the square chips mentioned above, and the distribution roll 5 is fluted to break up any tendency for the pieces to bunch together. A somewhat different distribution roll would be used with sandlike particles, for instance.

Where the material is to be fed to a calender for consolidation, it is necessary to feed more material into the zone adjacent to the roll necks than in the center of the nip between the rolls. There is some tendency for the rolls to "spring" at their centers, and there is also some tendency for the composition to flow laterally at the roll ends or necks. To overcome these inequalities, provision must be made to feed a thicker mass of material into the nip between the rolls at their ends than at the center.

Figure 2:
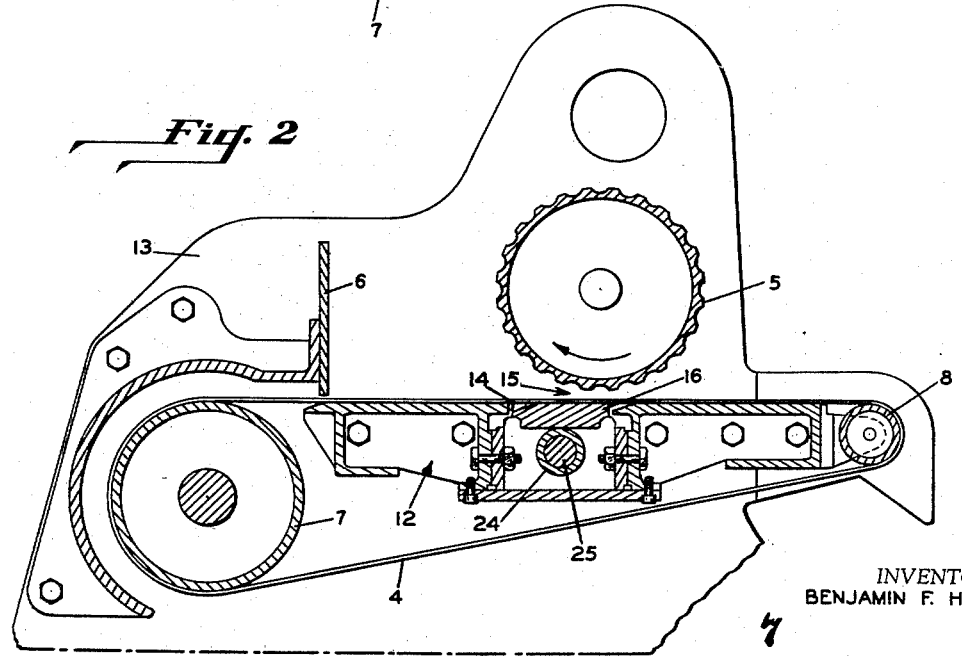
Figure 2 is a transverse sectional view showing a portion of the apparatus of Figure 1.

This may be accomplished by the mechanism shown in Figures 2 and 3. This includes a table 12 which extends across the width of the conveyor 4 and is secured to frame members 13, one of which is shown in Figure 2. The center of the table 12 is provided with a rectangular opening 14 which is disposed adjacent to the nip 15 defined between the conveyor 4 and the distribution roll 5, in a zone near the center of the distribution roll. A deflector plate 16 is mounted in the opening 14 in the manner shown in Figure 3. The table 12 has flanges 17 and 18 which overlie the transverse ends 19 and 20 of the deflector plate 16. Semicylindrical fulcrum bars 21 and 22 project from the transverse ends of the deflector plate 16 and lie in engagement with the underside of the flanges 17 and 18.

At the center of the deflector plate, a similar semicylindrical bar 23 is provided on the underside of the deflector plate 16. A sleeve type tapered cam 24 is arranged to cooperate with the bar 23 to arch the deflector plate from its center toward the fulcrum bars 21 and 22. An actuator shaft 25 is provided which is threaded into a sleeve 26 which is secured to the side frame member 13. The opposite end portion of the actuator shaft 25 is journaled in bearings 27 and 28 which are affixed to the table 12. The cam 24 is secured to actuator shaft 25 by a locking pin 29. The outboard end of the actuator shaft 25 may be squared to receive a crank or handwheel by which the shaft 25 may be rotated. A locking nut 30 may be provided to clamp the shaft 25 against rotation, after proper adjustment has been secured.

When actuator shaft 25 is moved to the left as viewed in Figure 3 by threading the same into the sleeve 26, the tapered cam 24 will move under the bar 23 and will arch the deflector plate 16 upwardly at its center. The amount of deflection may be closely controlled to insure the proper feeding of the mix to the calender. When proper adjustment has been attained, the locking nut 30 may be drawn tight against the threaded sleeve 26, and the desired arch in the deflector plate may be maintained.

The conveyor 4 which is preferably made of flexible material such as fabric-reinforced rubber belting will flex upwardly as it moves over the deflector plate 16 and will assume approximately the contour of the deflector plate.

In a unit for feeding mix to a calender, the rolls having an 80" face, the deflector plate may be about 3" wide and so constructed that the distance from the center of the bar 23 to the center of each of the bars 21 and 22 is about 33" or a total distance of about 66" between the fulcrum points. The plate may be arranged to be deflected from 0 to about ⅛" at its center. The entire table and deflector plate unit may be fabricated as a welded steel structure.

The nature of the mix being operated upon will determine to some extent the type of distribution roll to be used. As mentioned previously, where chips are being fed, it is desirable to have a fluted roll. Best results are achieved if this roll is rotated slowly in a direction opposed to the direction of movement of the mix. In some instances, a smooth rotating distribution roll may be used and in others a stationary roll may be used or a fixed distribution bar may be substituted. As shown in Figure 1, the mix may be fed by a belt conveyor to a vibrating feeder for delivery to the calender; and the arrangement may be such that the belt conveyor delivers the material directly into the nip between the calendar rolls. In each instance, however, the depth of the material fed to the calender is controllable so as to feed a gradually increasing amount of material from the center of the calender rolls toward the roll necks or ends.

With the present invention, it is possible to continuously feed a calender with a properly proportioned volume of mix to obtain the desired uniformity of thickness in the finished product. Also, it is possible to obtain calender formed graining effects which extend uniformly across the whole width of the formed sheet, eliminating the undesirable irregular effects occasioned where the calender is fed by hand and such uniformity of delivery of material to the nip between the rolls cannot be secured.

I claim:

1. A feeding device for particulate material comprising a delivery belt conveyor trained over guiding members which provide a substantially flat run for the delivery conveyor therebetween, means for advancing said delivery conveyor to deliver particulate material deposited thereon, metering means disposed above said delivery conveyor in said substantially flat run and extending transversely thereof for engagement with particulate material on said advancing delivery conveyor to meter the quantity of particulate material delivered by said delivery conveyor, and adjustable means over which said conveyor moves in its run below said metering means for arching said delivery conveyor upwardly in the center transversely thereof as it passes under said metering means to provide for delivery of a controlled volume of particulate material by said delivery conveyor which is greater at the edges than in the center thereof.

2. A feeding device for particulate material comprising a delivery belt conveyor trained over guiding members which provide a substantially flat run for the delivery conveyor therebetween, means for advancing said delivery conveyor to deliver particulate material deposited thereon, a rotatable metering roll disposed above said delivery conveyor in said substantially flat run and extending transversely thereof for engagement with particulate material on said advancing delivery conveyor to meter the quantity of particulate material delivered by said delivery conveyor, and adjustable means over which said conveyor moves in its run below said metering means for gradually arching said delivery conveyor upwardly in the center transversely thereof as it passes under said metering means to provide for delivery of a gradually increasing volume of particulate material from the center toward the edges of said delivery conveyor.

3. A feeding device for particulate material in accordance with claim 1 in which the delivery belt conveyor is in the form of a flexible rubber belt.

4. A feeding device for particulate material comprising a delivery belt conveyor trained over guiding members which provide a substantially flat run for the delivery conveyor therebetween, means for advancing said delivery conveyor to deliver particulate material deposited thereon, metering means disposed above said delivery conveyor in said substantially flat run and extending transversely thereof for engagement with particulate material on said advancing delivery conveyor to meter the quantity of particulate material delivered by said delivery conveyor, a table extending across the width of the conveyor in said substantially flat run, a deflector plate mounted in an opening in said table and over which plate said conveyor moves in its run below said metering means, and adjustable means for arching said deflector plate upwardly in the center transversely thereof, whereby said delivery conveyor is arched as it passes under said metering means to provide for delivery of a controlled volume of particulate material by said delivery conveyor which is greater at the edges than in the center thereof.

5. A feeding device for particulate material in accordance with claim 4 in which the deflector plate is fulcrumed adjacent to its edges by fulcrum bars disposed between said table and deflector plate and in which means are provided to engage said deflector plate at a point intermediate the fulcrumed ends of said plate to arch the deflector plate from its center toward its ends.

6. A feeding device for particulate material comprising a delivery belt conveyor trained over guiding members which provide a substantially flat run for the delivery conveyor therebetween, means for advancing said delivery conveyor to deliver particulate material deposited thereon, a rotatable fluted metering roll disposed above said delivery conveyor in said substantially flat run and extending transversely thereof and providing an effective metering surface which is substantially parallel to the plane of said flat run for engagement with particulate material on said advancing delivery conveyor to meter the quantity of particulate material delivered by said delivery conveyor, means for rotating said fluted metering roll in a direction opposite to the direction of movement of said delivery conveyor, and adjustable means over which said conveyor moves in its run below said metering means for arching said delivering conveyor upwardly in the center transversely thereof as it passes under said metering means to provide for delivery of a controlled volume of particulate material by said delivery conveyor which is greater at the edges than in the center thereof.

7. In a machine for forming a sheet from particulate material including a pair of movable consolidating surfaces defining a nip therebetween for the reception of particulate material to be formed into a sheet by consolidation between said surfaces, the combination of means for delivering particulate material to said nip in accordance with the consumption of material by said consolidating surfaces in sheet formation comprising a delivery belt conveyor trained over guiding members which provide a substantially flat run for the delivery conveyor therebetween, means for advancing said delivery conveyor in synchronism with the movement of said consolidating surfaces to deliver particulate material deposited thereon to said nip for sheet formation, metering means disposed above said delivery conveyor in said substantially flat run and extending transversely thereof for engagement with particulate material on said advancing delivery conveyor to meter the quantity of particulate material delivered by said delivery conveyor, and adjustable means over which said conveyor moves in its run below said metering means for arching said delivery conveyor upwardly in the center transversely thereof as it passes under said metering means to provide for delivery of a controlled volume of particulate material by said delivery conveyor which is greater at the edges than in the center thereof.

8. In a machine for forming a sheet from particulate material including a pair of rotatable calender rolls defining a nip therebetween for the reception of particulate material to be formed into a sheet by consolidation between said rolls, the combination of means for delivering particulate material to said nip in accordance with the consumption of material by said calender rolls in sheet formation comprising a delivery belt conveyor trained over guiding members which provide a substantially flat run for the delivery conveyor therebetween, means for advancing said delivery conveyor in synchronism with said calender rolls to deliver particulate material deposited on said conveyor to said calender rolls for consumption, metering means comprising a rotatable fluted roll disposed above said delivery conveyor in said substantially flat run and extending transversely thereof for engagement with particulate material on said advancing delivery conveyor to meter the quantity of particulate material delivered by said delivery conveyor, means for rotating said fluted metering roll in a direction opposed to the direction of movement of said delivery conveyor, and adjustable means over which said conveyor moves in its run below said metering means for gradually arching said delivery conveyor upwardly in the center transversely thereof as it passes under said metering means to provide for delivery of a gradually increasing volume of particulate material from the center toward the edges of said delivery conveyor.

References Cited in the file of this patent
UNITED STATES PATENTS

| | | |
|---|---|---|
| 586,778 | Marlow | July 20, 1897 |
| 806,625 | Beecher | Dec. 5, 1905 |
| 1,603,812 | Stein | Oct. 19, 1926 |
| 2,412,658 | Stuart et al. | Dec. 17, 1946 |
| 2,593,282 | Engler | Apr. 15, 1952 |
| 2,593,284 | Ewell | Apr. 15, 1952 |
| 2,608,939 | Naylor | Sept. 2, 1952 |
| 2,694,831 | Benedict et al. | Nov. 23, 1954 |
| 2,756,972 | Stokes et al. | July 31, 1956 |